July 9, 1929. W. W. ROBINSON Re. 17,368
SMOKE WASHER
Original Filed Oct. 13, 1924
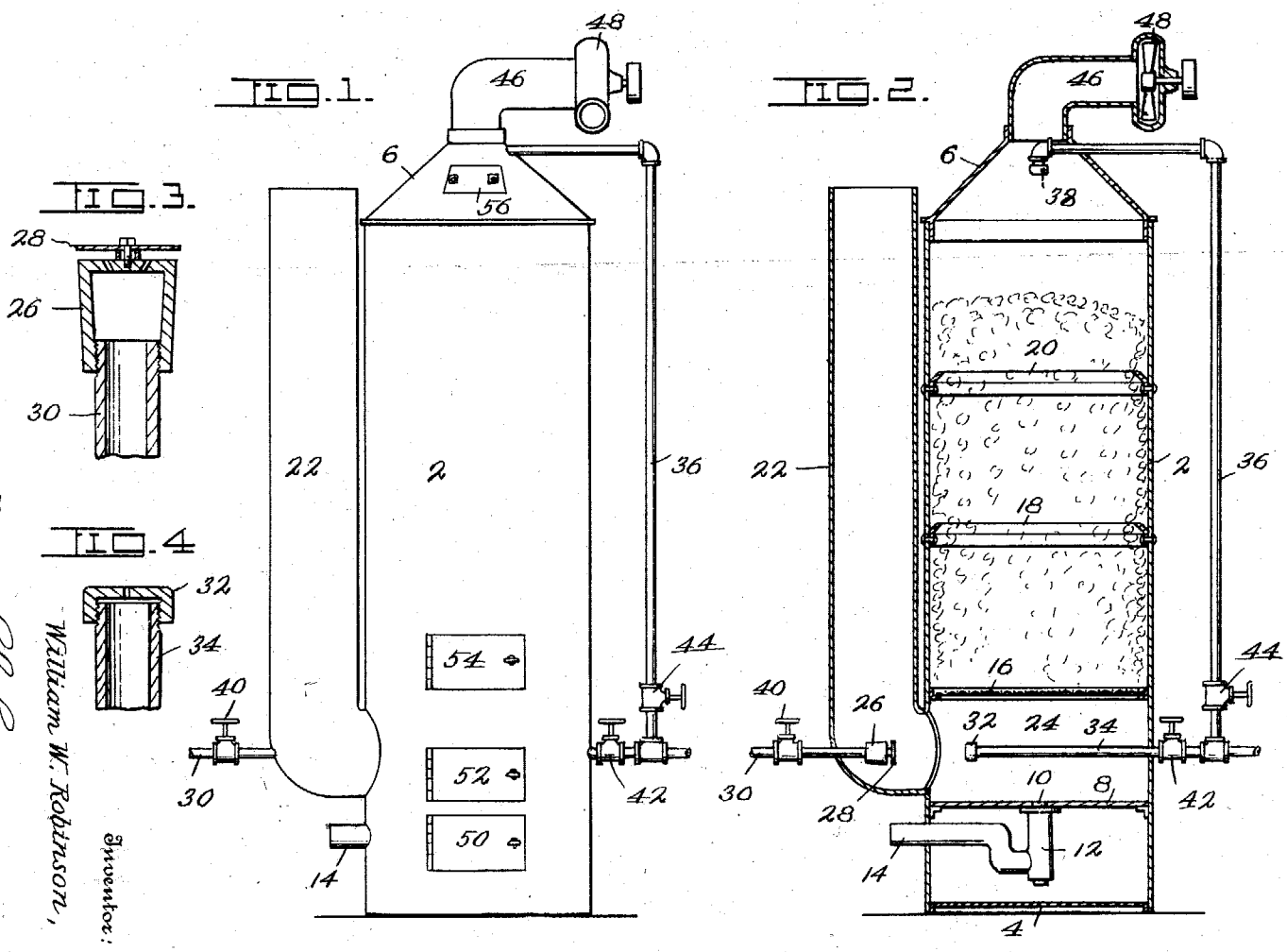
Inventor:
William W. Robinson,
By F. G. Fischer,
Attorney.
Witness:
Fred G. Fischer.

Reissued July 9, 1929.

Re. 17,368

UNITED STATES PATENT OFFICE.

WILLIAM W. ROBINSON, OF KANSAS CITY, MISSOURI, ASSIGNOR, BY DIRECT AND MESNE ASSIGNMENTS, TO ROBINSON SMOKE WASHER COMPANY, A DECLARATION OF TRUST.

SMOKE WASHER.

Original No. 1,593,310, dated July 20, 1926, Serial No. 743,374, filed October 13, 1924. Application for reissue filed March 9, 1928. Serial No. 260,516.

My invention relates to a smoke condenser and my object is to provide an efficient apparatus of this character which may be economically employed for condensing smoke emitted by domestic and industrial furnaces.

A further object is to provide an apparatus which will create a draft through the furnace and dispose of the gases and other products of combustion.

In order that the invention may be fully understood, reference will now be had to the accompanying drawings, in which:

Fig. 1 is a side elevation of the apparatus,

Fig. 2 is a vertical section of the apparatus,

Fig. 3 is a detail sectional view of a steam nozzle employed in carrying out the invention, Fig. 4 is a detail sectional view of a water nozzle employed in carrying out the invention.

Referring now in detail to the different parts, 2 designates a casing which is preferably cylindrical in cross section and has a base portion 4 and a removable cap 6.

The lower portion of the casing 2 is provided with a transverse partition 8 having a central outlet 10 communicating with a trap 12 depending from said partition 8 and provided with a drain pipe 14 leading to the exterior of the casing 2.

16 designates an open mesh tray arranged within the casing 2 at a suitable distance above the partition 8 for holding a filtering agent, such for instance as coke.

18 designates a baffle arranged within the casing 2 at a suitable point above the tray 16, and 20 designates another baffle spaced above the baffle 18.

22 designates an inlet pipe which may be connected to the smoke pipe of a furnace. Said inlet pipe 22 communicates with the chamber 24 formed by the casing 2, the partition 8 and the tray 16.

26 designates a steam nozzle arranged in the lower portion of the inlet pipe 22 and provided with a spreader 28. Said steam nozzle 26 is connected to a suitable source of supply, not shown, through the intermediacy of a steam pipe 30.

32 designates a water nozzle located within the chamber 24 for directing a mist towards the lower end of the inlet pipe 30. Said nozzle 32 is connected to a suitable source, not shown, through the intermediacy of a water pipe 34 which has a branch 36 leading to a nozzle 38 located in the cap 6. Valves 40, 42 and 44 provide means for independently controlling the flow of steam to the nozzle 26, and water to the nozzles 32 and 38, respectively, so that the supply to any one may be cut off without interfering with the supply to the others.

46 designates an outlet pipe leading from the cap 6 and connected to a suction fan 48.

The casing 2 is provided with doors 50, 52, 54 and 56, so that access may be readily had to the trap 12, the chamber 24, the tray 16, and the nozzle 38, respectively.

In practice the inlet pipe 22 is connected to the smoke pipe of a furnace after the tray 16 has been supplied with a filtering agent. The fan 48 is then set in motion for creating a draft through the casing 2 and drawing the smoke from the furnace. As the smoke is about to enter the casing 2 from the inlet pipe 22, it is sprayed with steam from the nozzle 26 and with water from the nozzle 32. This combination of sprays precipitates the carbon and other unconsumed solids of the products of combustion upon the partition 8, from which it is washed into the trap 12 and escapes through the drain 14. Said combination of sprays also dissipates the obnoxious gases present in the products of combustion. Any remaining products of combustion are drawn upwardly by the suction fan 48 through the filtering agent and mist from the nozzle 38, which cleanses said products of combustion of any solids or obnoxious odors which may have escaped from the sprays discharged from the nozzle 26 and 32. As said remaining products of combustion pass upwardly through the casing 2, they are distributed more or less uniformly through the filtering agent by the baffles 18 and 20.

During intervals when the apparatus is not in service any carbon or other products of combustion remaining upon the partition 8 may be removed through the door 52 while the filtering agent may be removed through the door 54 and cleansed for reuse, or a new supply may be provided as found necessary or desirable.

From the foregoing description it is apparent that I have provided a smoke condenser embodying the advantages above pointed out, and while I have shown and described the preferred construction, combination and arrangement of parts I reserve the right to make such changes as properly fall within the spirit and scope of the invention as claimed.

Having thus described my invention what I claim and desire to secure by Letters Patent, is:

1. An apparatus of the character described consisting of a casing having an inlet, a removable cap to said casing having an outlet, means connected to said outlet for creating a draft through the casing, a partition arranged in the casing at a point below the inlet, a drain leading from said partition, an open mesh tray within the casing and spaced above the inlet, superimposed baffles arranged in the casing above said tray, a steam nozzle arranged in the inlet, a water nozzle arranged in the casing and directed towards the inlet, and a water nozzle arranged in said cap, substantially as shown and described.

2. Apparatus of the class described comprising a casing, a smoke inlet conduit having its outlet end horizontally disposed and communicating with the lower portion of said casing, a nozzle in the casing adapted to spray water over the entire intake area for initially washing the smoke, an open mesh horizontal tray in the casing above the intake for supporting a quantity of filtering material through which the initially washed smoke is adapted to pass, means above said tray for spraying a fine mist of water upon the ascending gases and filtering material for further washing the same, a ring secured to the side walls of the casing above the tray, a transverse partition in the casing below the first named spray for collecting the spent water from both sprays, a drain leading from said partition through which the water and removed combustion products are discharged from the casing, an outlet conduit communicating with the upper portion of the casing, and a fan associated with the outlet conduit adapted to effect the circulation of gases from the inlet conduit through the casing to and through the outlet.

In testimony whereof I have subscribed my name.

WILLIAM W. ROBINSON.